United States Patent Office 3,116,272
Patented Dec. 31, 1963

3,116,272
POLYMERIZATION OF BUTADIENE WITH A $TiI_4$—$AlR_3$-ORGANIC HYDROXY COMPOUND CATALYST
Raymond A. Stewart and Lloyd A. McLeod, Sarnia, Ontario, Canada, assignors to Polymer Corporation Limited, Sarnia, Ontario, Canada, a body corporate and politic of Canada
No Drawing. Filed Oct. 26, 1959, Ser. No. 848,517
Claims priority, application Canada Oct. 30, 1958
9 Claims. (Cl. 260—94.3)

This invention relates generally to the polymerization of conjugated diolefins containing 4 to 8 carbon atoms. It relates to an improved process for polymerizing butadiene-1,3 and particularly to a process for producing a polymeric product containing a high proportion of polymer in the cis-1,4 configuration.

It has been established and is now widely recognized that the configuration of polymeric chains prepared from conjugated diolefins has a profound effect on the physical properties of the product. For example, Hevea rubber, which has a cis-1,4 configuration, possesses the resilience and low heat build-up qualities required for applications such as heavy duty truck tires. On the other hand, balata has a trans-1,4 configuration and is a hard polymer making it unsuitable for use in tires. Considerable effort has been expended in an effort to polymerize butadiene-1,3 to a polymer having a predominance of cis-1,4 material. When butadiene is polymerized in aqueous emulsion, not more than about 20% of the monomer units are present in the product in the cis configuration. When the polymerization is carried out using the so-called alfin catalyst or using an alkali metal catalyst, the product also contains only about 10 to 20% cis-1,4 material.

More recent work in this respect has been concentrated on the use of catalyst systems comprising metal alkyls, metal hydrides, or metal alkyl hydrides in combination with a tri- or tetrahalide of a heavy metal such as titanium. Some of these efforts have met with a limited degree of success but no completely satisfactory method has been evolved for producing the desired polymer on a commercial scale. It has been found that under some conditions a high cis product can be produced using a metal alkyl and a heavy metal halide but, unfortunately, the results are not reproducible and the yield is very low. In other words, it appears that the cis content of the product varies inversely with the yield. The reason for irreproducible results is not understood but it is presumed to be due to uncontrolled variables in the polymerization system originating either with the monomer or the catalyst. Whatever the reason, the yield and composition of the product vary to such an extent that a satisfactory commercial operation could not be established up to now based on these catalyst systems.

The main object of this invention is to provide a process for the polymerization of butadiene-1,3 to produce a product containing a high percentage of polymer in the cis-1,4 configuration.

A further object is to provide a process for reproducibly polymerizing butadiene-1,3 to a high cis product while at the same time achieving high conversion of monomer.

The inventors have now discovered in the polymerization of butadiene-1,3 that the addition of certain hydroxy compounds to a catalyst combination comprising an organo-metallic compound and an iodide of a heavy metal in which the metal is in its maximum valence state, results in the reproducible production in high yield of polymers containing a high percentage of cis-1,4 material and a low percentage of 1,2 material.

The objects of the present invention are achieved by the process which comprises polymerizing butadiene-1,3 in the presence of a catalyst system obtained by admixing an iodide of a heavy metal of groups IV, V or VI of the periodic table, said metal being in its maximum valence state, an organo-metallic compound having a hydrocarbon group attached directly to a metal of group IIIA of the periodic table, and an organic hydroxy compound.

The periodic table referred to in the specification and claims is that shown on page 342, Handbook of Chemistry and Physics, 33rd edition, published by the Chemical Rubber Publishing Company, Cleveland, Ohio, 1951.

The organo-metallic compounds which are useful in the catalyst systems of the present invention are those having a hydrocarbon group attached directly to a metal selected from group IIIA of the periodic table. The compounds may be represented by the general formula

in which Me is a metal of group IIIA. $R_1$, $R_2$ and $R_3$ are independently selected from the group consisting of hydrogen, alkyl, aryl, alkylaryl, and cycloalkyl hydrocarbon. Examples of such compounds are aluminum triethyl, aluminum triisobutyl, aluminum trimethyl, aluminum trihexadecyl, monomethyl aluminum diethyl, monoethyl aluminum dimethyl, monoethyl aluminum dihexadecyl, monohexadecyl aluminum diisobutyl, aluminum triphenyl, aluminum monoethyl dihydride, aluminum diethyl monohydride, and various other combinations of the metals of group IIIA with similar and other hydrocarbon groups. The metals which may be used in these organo-metallic compounds are aluminum, gallium, indium and thallium and of these aluminum is preferred. The size of the organic radicals attached to the metal is not critical although it is generally desirable to use those having fewer than about 20 carbon atoms and it is preferred that they have fewer than 8 carbon atoms.

The iodides which may be used in the catalyst system in the practice of the invention are iodides of the heavy metals of groups IV, V and VI of the periodic table, with the metals in their maximum valence state. Heavy metals are herein considered to be those having an atomic number of 22 or higher. Examples of the compounds which may be used are titanium tetraiodide, zirconium tetraiodide, vanadium pentaiodide and molybdenum hexaiodide. The preferred compound is titanium tetraiodide.

The organic hydroxy compounds which may be used in the catalyst system of the present invention may be any of a wide number of compounds containing the OH group. For example, they may be the well-known branched or straight chain aliphatic monohydroxy alcohols such as methanol, ethanol, n-propanol, isopropanol, n-butanol, isobutanol, tertiarybutanol, as well as longer chain alcohols such as amyl alcohol, octyl alcohol, decyl alcohol and dodecyl alcohol and the like. They may also include dihydroxy alcohols such as glycols including ethylene glycol, propylene glycol, butylene glycol, as well as high molecular weight glycols, and diols such as 1,2-propanediol, 1,4-butanediol, 1,5-pentanediol and 1,10-decanediol. Or they may include other polyhydroxy alcohols such as glycerol, erythritol, and mannitol. Other hydroxy compounds which may be used are aromatic hydroxy compounds such as phenol, catechol, resorcinol, hydroquinone and pyrogallol as well as carboxylic acids such as formic acid, acetic acid, oxalic acid, benzoic acid, cinnamic acid, salicylic acid and others. The variety of hydroxy compounds which may be used is thus seen to be very extensive. There is no theoretical limit to the molecular weight of such compounds which can be used, but for practical purposes it is desirable that they should not contain more than about 20 carbon atoms and preferably not more than about 12 carbon atoms.

The mole ratio of organo-metallic compound to the iodide compound in the catalyst combination may vary over a range from about 3/1 to about 10/1, although it is preferred for best results in the practice of the present invention to use a mole ratio between about 6/1 and 8/1. The yield of polymer is reduced when the ratio is either too low or too high and the actual optimum ratio under various operating conditions may be readily determined.

The quantity of the hydroxy compound which is used in the polymerization recipe is best expressed in relation to the amount of ingredients in the catalyst system. The quantity necessary for the production of the high cis polymers of the invention varies depending upon the particular hydroxy compound being used and its concentration is conveniently expressed in moles per mole of organo-metallic compound. Thus it may be present in the amount of about 0.3 to 1.0 mole per mole of the organo-metallic compound in the catalyst system, while the preferred usage is from about 0.5 to 0.9 mole per mole of organo-metallic compound.

The hydroxy compound may be added to the polymerization vessel at any desired step in the charging procedure. For example, it may be mixed with either the iodide or the organo-metallic compound before these two components are mixed; it may be added to a mixture of the iodide and the organo-metallic compound before they are contacted wtih the butadiene; or it may even be added to the polymerization vessel during the polymerization reaction. The preferred procedure is to add it either to the iodide before the latter is mixed with the organo-metallic compound or to a mixture of the iodide and organo-metallic compound before they are contacted with the butadiene.

The polymerization may be carried out over a wide range of temperatures, although it is generally undesirable to operate above about 100° C. There is, likewise, no critical low temperature and the polymerization may be carried out at a temperature as low as —75° C. or lower. The preferred operating temperature range is between about —15° C. and +70° C. Polymerization may be carried out while the reactants are dispersed in a non-reactive liquid medium such as pentane, hexane, heptane, cyclohexane, benzene, toluene, or any other relatively low boiling non-reactive solvent which can be readily removed from the reaction product by vaporization. The proportion of the solvent is not critical but should generally be such that the viscosity of the reactor contents is low enough to permit thorough mixing and adequate temperature control. However the solvent does not take part in the polymerization reaction and its presence is not necessary for the practice of the invention. In this case monomeric butadiene-1,3 acts as a reaction medium.

The invention will be described in greater detail by means of experimental results. The following experiments were carried out using commercial grade butadiene unless otherwise specified. This material consisted of 96.5 to 98.5% butadiene-1,3 with the balance including butane, butene-1, butene-2 and water. The research grade monomer used in Example III consisted of at least 99% butadiene-1,3.

EXAMPLE I

This experiment was carried out in an attempt to polymerize butadiene-1,3 to a high conversion and produce a polymer having a high cis content in the absence of the hydroxy compounds of the present invention. Nine standard seven-ounce crown capped polymerization bottles were charged according to the following recipe:

n-Pentane_____ 30 mls.
Titanium tetraiodide_____ 0.36×10⁻³ moles (as a 1% solution in n-heptane).
Aluminum triisobutyl_____ Variable (as a 1 molar solution in n-heptane).
Butadiene-1,3_____ 10 mls.

The n-pentane was first dried over calcium hydride prior to charging into the bottles which had previously been thoroughly dried and flushed with nitrogen. After adding the catalyst ingredients in the order shown above, the bottles were capped and maintained at 30° C. for 18 hours. The reaction was then stopped by the injection of an excess of ethanol. The product in each bottle was transferred to a separate flask and heated to 35°–50° C. for a period of one hour to evaporate the diluent. The polymer which remained was then extracted with boiling ethanol to destroy residual catalyst and dried under vacuum at 50° C. for 16 hours. Structural analysis of the polymer was determined by means of an infra-red spectrophotometer. The analyses are based on the assumption that the polymer contains one unsaturated bond for each monomer unit. The results are shown in Table I.

Table I
EFFECT OF MOLE RATIO OF Al(iC₄H₉)₃ TO TiI₄ ON YIELD AND STRUCTURE

| Bottle No. | Mole Ratio of Al(iC₄H₉)₃/TiI₄ | Conversion (percent) | Cis 1,4 Content (percent of total) | 1,2 Content (percent total) |
|---|---|---|---|---|
| 1 | 3.2 | 100 | 50 | 5 |
| 2 | 3.5 | 80 | 40 | 5 |
| 3 | 3.7 | 74 | 40 | 5 |
| 4 | 4.4 | 62 | 46 | 5 |
| 5 | 5.0 | 77 | 44 | 5 |
| 6 | 6.1 | 25 | 47 | 5 |
| 7 | 6.7 | 6 | 62 | 18 |
| 8 | 8.3 | 5 | 78 | 19 |
| 9 | 10.0 | 5 | 73 | 21 |

The results show that catalyst ratios between about 3 and 6 produce polymer having a cis content ranging from about 40 to about 50%. Catalyst ratios of 6.7 to 10 produce a polymer having a higher cis content, but the yield is greatly reduced and the 1,2 content of the polymer is increased. For instance, the cis content is above 60% only for those polymers in which 6% or less of the butadiene has polymerized.

EXAMPLE II

The polymerization of butadiene-1,3 was carried out in accordance with the present invention by carrying out polymerizations as described in Example I using various quantities of ethanol in the following recipe:

n-Pentane_____ 90 mls.
Titanium tetraiodide_____ 1.08×10⁻³ moles (as a 1% solution in n-heptane).
Aluminum triisobutyl_____ 7.2×10⁻³ moles (as a 1 molar solution in n-heptane).
Ethanol_____ Variable.
Butadiene-1,3_____ 30 mls.

The mol ratio of aluminum triisobutyl to titanium tetraiodide was thus 6.6:1 and the polymerization reaction was carried out for 16 hours at 30° C. The products were finished and analyzed as in Example I. The analyses of the polymers produced are shown in Table II.

Table II
EFFECT OF ETHANOL

| Bottle No. | Ethanol (moles) | Mole Ratio of Ethanol to Al(iC₄H₉)₃ | Conversion (percent) | Cis Content (percent of total) |
|---|---|---|---|---|
| 1 | 1.80 | 0.25 | 16 | 33 |
| 2 | 3.60 | 0.50 | 78 | 43 |
| 3 | 4.10 | 0.57 | 78 | 62 |
| 4 | 4.36 | 0.61 | 80 | 75 |
| 5 | 4.56 | 0.63 | 57 | 87 |
| 6 | 4.62 | 0.64 | 80 | 82 |
| 7 | 4.87 | 0.68 | 64 | 80 |
| 8 | 5.13 | 0.71 | 48 | 85 |
| 9 | 5.64 | 0.78 | 23 | 90 |

These data show that the presence of ethanol in the charge recipe results in a substantial increase in the cis content of the product for mole ratios of ethanol to aluminum triisobutyl between about 0.61 and 0.78 and that for ratios between about 0.61 and 0.71 both the cis content and the conversion level are satisfactory. These data, therefore, indicate that an improved balance is achieved between conversion and cis content in the presence of ethanol.

EXAMPLE III

Polymerizations were carried out exactly as in Example II except that research grade butadiene-1,3 was used instead of commercial grade butadiene-1,3. The results shown in Table III were obtained.

Table III
EFFECT OF ETHANOL ON POLYMERIZATION OF RESEARCH GRADE BUTADIENE

| Bottle No. | Ethanol (moles) | Mole Ratio of Ethanol to Al(iC₄H₉)₃ | Conversion (Percent) | Cis Content (Percent of total) |
|---|---|---|---|---|
| 1 | 4.87 | 0.68 | 73 | 69 |
| 2 | 5.38 | 0.75 | 80 | 80 |
| 3 | 5.64 | 0.78 | 76 | 82 |
| 4 | 6.16 | 0.86 | 79 | 78 |
| 5 | 6.50 | 0.90 | 50 | 81 |
| 6 | 6.84 | 0.95 | 45 | 82 |
| 7 | 7.18 | 1.00 | 20 | 81 |

The data of Tables II and III show that the amount of ethanol which is required depends to a certain extent upon the purity of the butadiene, more ethanol being required for a higher purity butadiene. For example, using research grade material the best balance of conversion and product composition is achieved using a mole ratio of ethanol to aluminum alkyl between about 0.7 and 0.9. At lower ratios the product is lower in cis content and at higher ratios the conversion decreases significantly. The possibility of producing a product having a highly uniform cis content is illustrated by the fact that for mole ratios of ethanol to aluminum triisobutyl varying from 0.75 to 1.0 the cis content of the product only varies between 78 and 81%.

EXAMPLES IV-VII

Polymerizations were carried out as in Example II using various alcohols in place of ethanol and using 0.90×10⁻³ mole of titanium tetraiodide and 6.0×10⁻³ moles of aluminum triisobutyl. The conversion obtained in each run and the percentage of the product in the cis-1,4 configuration are shown in Table IV.

Table IV
EFFECT OF VARIOUS MONOHYDROXY ALCOHOLS

| Example No. | Bottle No. | Hydroxy Compound Type | (moles×10⁻³) | Mole Ratio of Hydroxy Cpd./Al(iC₄H₉)₃ | Conversion (percent) | Cis Content (percent of total) |
|---|---|---|---|---|---|---|
| IV | 1 | methanol | 2.45 | 0.41 | 75 | 63 |
|  | 2 | ---do--- | 2.70 | 0.45 | 50 | 87 |
|  | 3 | ---do--- | 2.94 | 0.49 | 0 |  |
|  | 4 | ---do--- | 3.43 | 0.57 | 16 | 90 |
|  | 5 | ---do--- | 4.41 | 0.73 | 5 | 88 |
| V | 1 | n-butanol | 2.18 | 0.36 | 52 | 54 |
|  | 2 | ---do--- | 3.27 | 0.55 | 85 | 64 |
|  | 3 | ---do--- | 4.37 | 0.73 | 79 | 80 |
|  | 4 | ---do--- | 5.45 | 0.91 | 0 |  |
| VI | 1 | t-butanol | 1.07 | 0.18 | 88 | 49 |
|  | 2 | ---do--- | 1.60 | 0.27 | 71 | 52 |
|  | 3 | ---do--- | 1.87 | 0.31 | 73 | 75 |
|  | 4 | ---do--- | 2.14 | 0.36 | 81 | 79 |
|  | 5 | ---do--- | 3.21 | 0.54 | 0 |  |
| VII | 1 | n-decanol | 1.70 | 0.24 | 79 | 54 |
|  | 2 | ---do--- | 2.49 | 0.42 | 7 | 81 |

These data show that a variety of monohydroxy alcohols can be used as additives in the production of polybutadiene in the practice of the invention.

EXAMPLES VIII-XII

Polymerizations were carried out as in Examples IV-VII except that ethylene glycol, 1,4-butanediol, 1,10-decanediol, phenol and acetic acid were present instead of the monohydroxy alcohols. The results are shown in Table V.

Table V
EFFECT OF VARIOUS HYDROXY COMPOUNDS

| Example No. | Bottle No. | Hydroxy Compound Type | (moles×10⁻³) | Mole Ratio of Hydroxy Cpd./Al(iC₄H₉)₃ | Conversion (percent) | Cis Content (percent of total) |
|---|---|---|---|---|---|---|
| VIII | 1 | ethylene glycol | 0.90 | 0.15 | 6 | 56 |
|  | 2 | ---do--- | 2.70 | 0.45 | 44 | 58 |
|  | 3 | ---do--- | 4.50 | 0.75 | 100 | 69 |
|  | 4 | ---do--- | 5.40 | 0.90 | 58 | 74 |
|  | 5 | ---do--- | 6.30 | 1.05 | 11 | 72 |
| IX | 1 | 1,4-butanediol | 0 | --- | 3 | 65 |
|  | 2 | ---do--- | 2.28 | 0.38 | 77 | 58 |
|  | 3 | ---do--- | 3.42 | 0.57 | 87 | 75 |
|  | 4 | ---do--- | 3.99 | 0.66 | 80 | 75 |
|  | 5 | ---do--- | 4.56 | 0.76 | 19 | 71 |
| X | 1 | 1,10-decanediol | 0.86 | 0.14 | 21 | 49 |
|  | 2 | ---do--- | 2.01 | 0.33 | 62 | 57 |
|  | 3 | ---do--- | 3.15 | 0.52 | 63 | 64 |
|  | 4 | ---do--- | 3.73 | 0.62 | 11 | 74 |
| XI | 1 | phenol | 1.82 | 0.30 | 86 | 77 |
| XII | 1 | acetic acid | 1.14 | 0.19 | 76 | 47 |
|  | 2 | ---do--- | 1.84 | 0.31 | 85 | 69 |
|  | 3 | ---do--- | 2.19 | 0.37 | 80 | 79 |
|  | 4 | ---do--- | 2.54 | 0.42 | 79 | 79 |

The data of the examples show that a wide variety of hydroxy compounds can be used to produce polybutadiene with a high cis-1,4 content. The quantity of these compounds necessary for best results depends on the particular compound being used. Such quantity is between about 0.3 and 0.9 mole of hydroxy compound per mole of organo-metallic compound and the preferred value for a particular hydroxy compound can be readily determined by those skilled in the art.

We claim:

1. The process of producing a polymer of butadiene in which the units are predominantly in the cis-1,4 configuration which comprises polymerizing butadiene-1,3 at a temperature between −75° C. and +100° C. in the presence of a catalyst system formed by admixing an iodide of titanium in which the titanium is in its maximum valence state, an organo-metallic compound having the formula

in which $R_1$, $R_2$ and $R_3$ are selected independently from the group consisting of hydrogen, alkyl, aryl, alkylaryl and cycloalkyl hydrocarbon radicals, and an organic hydroxy compound having from 1–12 carbon atoms, the charge ratio of said organo-metallic compound to said iodide of titanium being between 3/1 and 10/1 on a molar basis, and said organic hydroxy compound being present in the amount of 0.3 to 1.0 mole per mole of said organo-metallic compound.

2. The process according to claim 1 in which said organo-metallic compound is an aluminum trialkyl in which the alkyl groups each contain fewer than 8 carbon atoms.

3. The process according to claim 1 in which said organic hydroxy compound is a monohydroxy alcohol.

4. The process according to claim 1 in which said organic hydroxy compound contains at least two hydroxy groups.

5. The process according to claim 1 in which said organic hydroxy compound is an acetic acid.

6. The process of producing a polymer of butadiene in which the units are predominantly in the cis-1,4 configuration which comprises polymerizing butadiene-1,3 at a temperature between $-15°$ and $+70°$ C. in the presence of a catalyst system formed by admixing titanium tetraiodide, an organo-metallic compound having the formula

in which $R_1$, $R_2$ and $R_3$ are alkyl groups each having fewer than 8 carbon atoms, and an organic hydroxy compound containing from 1–12 carbon atoms, the ratio of said organo-metallic compound to titanium tetraiodide being between 3/1 and 10/1 on a molar basis, and said organic hydroxy compound being present in the amount of 0.3 to 1.0 per mole of said organo-metallic compound.

7. The process according to claim 6 in which said organic hydroxy compound is a monohydroxy alcohol.

8. The process of producing a polymer of butadiene in which the units are predominantly in the cis-1,4 configuration which comprises polymerizing butadiene-1,3 at a temperature between $-15°$ C. and $+70°$ C. in the presence of a catalyst system formed by admixing titanium tetraiodide, an organo-metallic compound having the formula

in which $R_1$, $R_2$ and $R_3$ are alkyl groups having fewer than 8 carbon atoms, and a monohydroxy alcohol containing fewer than 12 carbon atoms, the charge ratio of said organo-metallic compound to said titanium tetraiodide being between about 6:1 and 8:1 on a molar basis and said monohydroxy alcohol being present in the amount of about 0.5 to 0.9 mole per mole of said organo-metallic compound.

9. The process according to claim 8 in which said monohydroxy alcohol contains from 1 to 4 carbon atoms.

References Cited in the file of this patent
UNITED STATES PATENTS

| | | |
|---|---|---|
| 2,905,659 | Miller et al. | Sept. 22, 1959 |

FOREIGN PATENTS

| | | |
|---|---|---|
| 1,171,450 | France | Oct. 6, 1958 |
| 543,292 | Belgium | June 2, 1956 |
| 551,851 | Belgium | Apr. 17, 1957 |